US011919292B2

(12) United States Patent
Tanaka

(10) Patent No.: US 11,919,292 B2
(45) Date of Patent: Mar. 5, 2024

(54) INK DISCHARGING APPARATUS, INK DRYING METHOD, AND WATER-BASED INK FOR RECORDING

(71) Applicant: BROTHER KOGYO KABUSHIKI KAISHA, Nagoya (JP)

(72) Inventor: Hiroyuki Tanaka, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 237 days.

(21) Appl. No.: 17/542,572

(22) Filed: Dec. 6, 2021

(65) Prior Publication Data

US 2022/0088945 A1    Mar. 24, 2022

Related U.S. Application Data

(63) Continuation of application No. PCT/JP2020/023176, filed on Jun. 12, 2020.

(30) Foreign Application Priority Data

Jul. 10, 2019   (JP) ................................. 2019-128277

(51) Int. Cl.
*B41J 11/00*         (2006.01)
*B41J 2/21*          (2006.01)
(Continued)

(52) U.S. Cl.
CPC ....... *B41J 11/00218* (2021.01); *B41J 2/2107* (2013.01); *B41J 11/00212* (2021.01);
(Continued)

(58) Field of Classification Search
CPC ................ B41J 11/00218; B41J 2/2107; B41J 11/00212; B41J 11/00216; B41M 5/0023;
(Continued)

(56) References Cited

U.S. PATENT DOCUMENTS

| 2004/0114013 A1* | 6/2004 | Doi ...................... C09D 11/322 |
| | | 347/100 |
| 2011/0090279 A1 | 4/2011 | Yanagi et al. |

(Continued)

FOREIGN PATENT DOCUMENTS

| AU | 2017-202189 A1 | 3/2018 | |
| EP | 2354194 A1 * | 8/2011 | ........... C09D 11/322 |

(Continued)

OTHER PUBLICATIONS

Office Action (Notice of Reasons for Refusal) issued in corresponding Japanese Patent Application No. 2019-128277, dated Jul. 18, 2023.

(Continued)

*Primary Examiner* — Yaovi M Ameh
(74) *Attorney, Agent, or Firm* — Merchant & Gould P.C.

(57) ABSTRACT

There is provided an ink discharging apparatus including a controller which controls conveying speed of a recording medium so that a cumulative heating amount received per unit area of the recording medium from a heater is in a range of 0.7 J/cm² to 2.9 J/cm². A water-based ink included in the ink discharging apparatus contains a first water-soluble organic solvent of which saturated vapor pressure at 20° C. is 0.03 hPa to 2.20 hPa. The first water-soluble organic solvent is contained in a range of 10% by mass to 40% by mass. A content amount of a second water-soluble organic solvent, of which saturated vapor pressure at 20° C. is greater than 2.20 hPa, is less than 3% by mass; and a content amount of a third water-soluble organic solvent, of which saturated vapor pressure at 20° C. is less than 0.03 hPa, is less than 10% by mass.

16 Claims, 4 Drawing Sheets

(51) Int. Cl.
  *B41M 5/00* (2006.01)
  *C09D 11/10* (2014.01)
  *C09D 11/106* (2014.01)
  *C09D 11/322* (2014.01)
  *B41M 7/00* (2006.01)
(52) U.S. Cl.
  CPC ........... *B41M 5/0023* (2013.01); *C09D 11/10* (2013.01); *C09D 11/106* (2013.01); *C09D 11/322* (2013.01); *B41J 11/00216* (2021.01); *B41M 7/009* (2013.01)
(58) Field of Classification Search
  CPC ...... B41M 7/009; C09D 11/10; C09D 11/106; C09D 11/322
  See application file for complete search history.

(56) References Cited

U.S. PATENT DOCUMENTS

2011/0217468 A1 9/2011 Maruyama et al.
2011/0234727 A1* 9/2011 Aoki .................. B41M 5/0011
                                                      347/102

FOREIGN PATENT DOCUMENTS

| JP | 2001-212948 A | | 8/2001 | |
| JP | 2011-83968 A | | 4/2011 | |
| JP | 2012-201691 A | | 10/2012 | |
| JP | 2015-120918 A | | 7/2015 | |
| JP | 2016138160 A | * | 8/2016 | ........... C09D 11/322 |
| JP | 2017-155246 A | | 9/2017 | |
| JP | 2018-35295 A | | 3/2018 | |
| JP | 2018-159037 A | | 10/2018 | |
| JP | 2019-59878 A | | 4/2019 | |

OTHER PUBLICATIONS

International Preliminary Report on Patentability and Written Opinion of the International Searching Authority issued in corresponding International Patent Application No. PCT/JP2020/023176, dated Jan. 11, 2022.
International Search Report issued in PCT/JP2020/023176 dated Aug. 18, 2020.

* cited by examiner

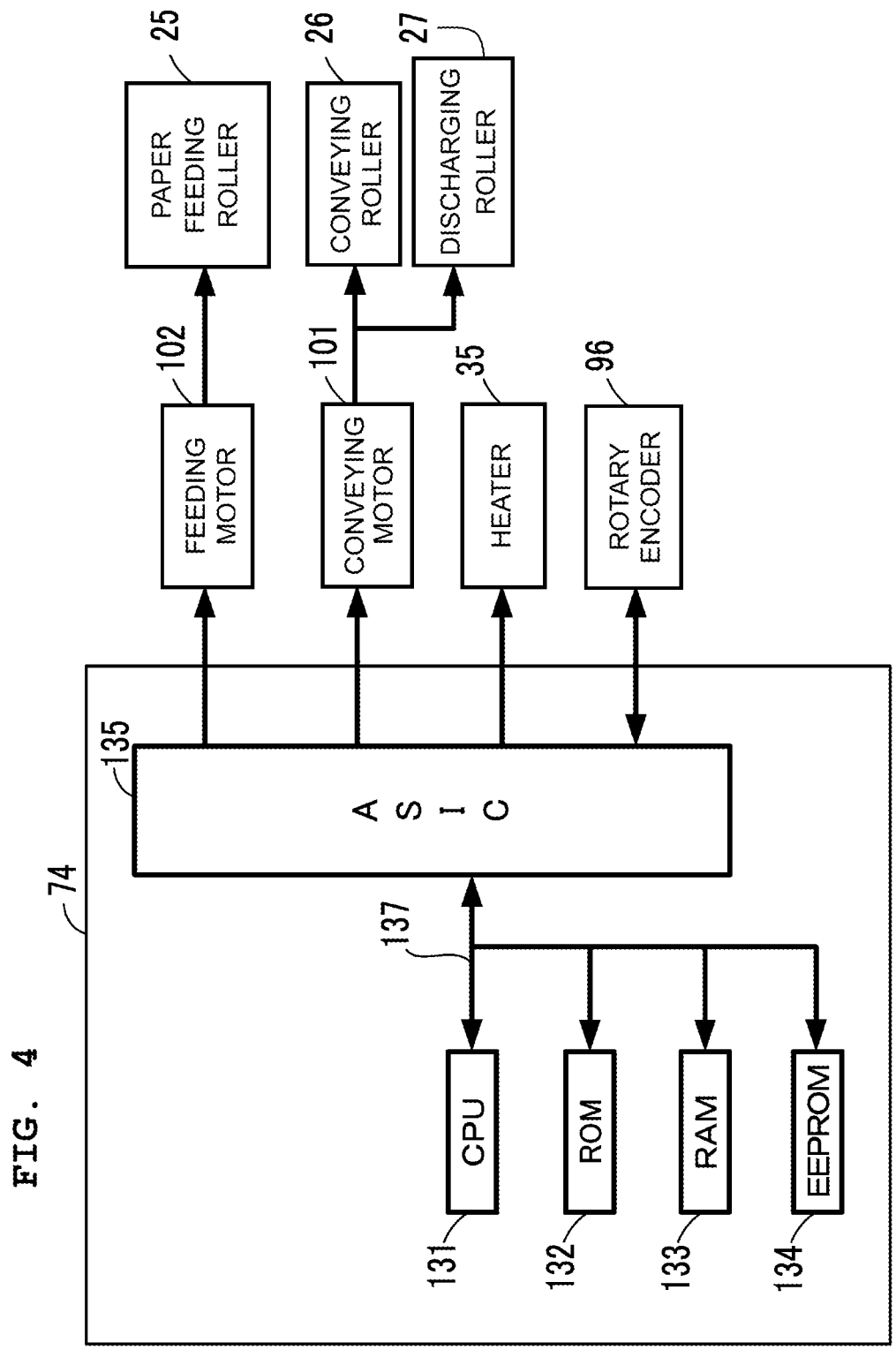

INK DISCHARGING APPARATUS, INK DRYING METHOD, AND WATER-BASED INK FOR RECORDING

CROSS REFERENCE TO RELATED APPLICATIONS

The present application is a Continuation Application of International Application No. PCT/JP2020/023176 filed on Jun. 12, 2020 claiming priority from Japanese Patent Application No. 2019-128277 filed on Jul. 10, 2019. The disclosures of International Application No. PCT/JP2020/023176 and Japanese Patent Application No. 2019-128277 are incorporated herein by reference in their entireties.

BACKGROUND

The present disclosure relates to an ink discharging apparatus, an ink heating method, and a water-based ink for recording. More specifically, the present disclosure relates to an ink discharging apparatus provided with a mechanism which heats, by a heater, an ink discharged onto and adhered to a recording medium so as to fix the ink to the recording medium, an ink heating method (ink drying method) for fixing an ink discharged onto and adhered to a recording medium so as to fix the ink to the recording medium, and a water-based ink for recording which is suitable for being discharged onto and adhered to a recording medium and for being heated by a heater to be fixed to the recording medium.

There is known a printing apparatus wherein a recording medium to which an ink discharged from a nozzle of a printing head is adhered is heated by a heater so that the ink is fixed to the recording medium.

SUMMARY

In a case that printing using a water-based ink containing a pigment is performed on a low water-absorbing or non-water absorbing recording medium, it is problematic that, if a printing surface of the recording medium for which the printing has been performed is rubbed or scratched, etc., the ink is removed or peeled off from the printing surface. Accordingly, it is desired that the ink is fixed to the recording medium in an ensured manner by a heating with a heater, etc.

Further, in a case that the size of the heater is increased so as to quickly perform the heating of the recording medium by the heater, there is such a problem that the size of the apparatus becomes large in order to secure a space for exhausting the heat, in addition to a space occupied by the heater itself. Furthermore, an ink which is easily dried is likely to solidify in the vicinity of the nozzle of a printing head due to the drying. Such a solidified ink is hard to be re-dispersed, which in turn likely to adversely affect a discharging stability of the printing head. In order to provide an improvement regarding the above-described problem, it is effective to add a water-soluble organic solvent having a moistening effect to the ink. However, in a case that the saturated vapor pressure of the water-soluble organic solvent is small, the evaporation rate of the water-soluble organic solvent is slow, which in turn lead to a non-dried state of the ink on the recording medium. This inhibits the fixing of the ink on the recording medium and makes the abrasion resistance (rubbing resistance, scratch resistance) of the ink to be insufficient, in some cases. On the other hand, in a case of a small-sized apparatus, a resin member is used therefor in many cases, rather than using a metal member, in view that the mechanical strength required therefor is small and that the weight of the main body of the apparatus is to be made small. However, in a case that the saturated vapor pressure of the water-soluble organic solvent contained in the water-based ink is great, there is such a fear that any degradation and/or any lowering in the strength of a part or component of which row material is rubber or resin elastomer might be caused by the water-soluble organic solvent which is vaporized in an internal space of the apparatus. Further, in a case of lowering the concentration of the vaporized water-soluble organic solvent by evacuation, there is also such a problem that, due to the need for securing a space for the evacuation, the size of the apparatus might become great.

The present disclosure has been made in view of the above-described situation, and an object of the present disclosure is to provide an ink discharging apparatus which has an excellent abrasion resistance of the recording medium after printing and an excellent re-dispersibility of the ink and which is less likely to effect the durability of the apparatus, while suppressing the size of the apparatus from becoming large.

According to a first aspect of the present disclosure, there is provided an ink discharging apparatus including: a conveyor configured to convey a recording medium in a conveying direction; a head configured to discharge the water-based ink for recording onto the recording medium conveyed by the conveyor; a heater which is located at downstream in the conveying direction of the head, and which is configured to heat the recording medium or the water-based ink for recording adhered to the recording medium; and a controller configured to control the conveyor, the head and the heater. The controller is configured to control the conveyor and the heater so as to control a conveying speed of the recording medium at a facing position at which the recording medium faces the heater so that a cumulative heating amount received per unit area of the recording medium from the heater at the facing position is in a range of 0.7 J/cm$^2$ to 2.9 J/cm$^2$. The water-based ink for recording includes: a resin-dispersed pigment, resin fine particles, water, and a first water-soluble organic solvent of which saturated vapor pressure at 20° C. is in a range of 0.03 hPa to 2.20 hPa. The first water-soluble organic solvent is included in a range of 10/o by mass to 40% by mass to an entire amount of the water-based ink for recording. A content amount of a second water-soluble organic solvent, of which saturated vapor pressure at 20° C. is greater than 2.20 hPa, is less than 3% by mass to the entire amount of the water-based ink for recording. A content amount of a third water-soluble organic solvent, of which saturated vapor pressure at 20° C. is less than 0.03 hPa, is less than 10% by mass to the entire amount of the water-based ink for recording.

According to a second aspect of the present disclosure, there is provided an ink heating method of using the ink discharging apparatus of the first aspect. The ink heating method includes conveying the recording medium to which the water-based ink for recording is adhered so that the cumulative heating amount received per unit area of the recording medium from the heater at the facing position is in a range of 0.7 J/cm$^2$ to 2.9 J/cm$^2$.

According to a third aspect of the present disclosure, there is provided a water-based ink for recording, including: a resin-dispersed pigment, resin fine particles, water, and a first water-soluble organic solvent of which saturated vapor pressure at 20° C. is in a range of 0.03 hPa to 2.20 hPa. The first water-soluble organic solvent is included in a range of 10% by mass to 40% by mass to an entire amount of the water-based ink for recording. A content amount of a second water-soluble organic solvent, of which saturated vapor pressure at 20° C. is greater than 2.20 hPa, is less than 3% by mass to the entire amount of the water-based ink for recording. A content amount of a third water-soluble organic solvent, of which saturated vapor pressure at 20° C. is less than 0.03 hPa, is less than 10% by mass to the entire amount of the water-based ink for recording. The water-based ink for recording discharged from a printing head is fixed to a recording medium in a state that the recording medium is heated by a heater so that a cumulative heating amount received per unit area of the recording medium from the heater is in a range of 0.7 J/cm$^2$ to 2.9 J/cm$^2$.

BRIEF DESCRIPTION OF THE DRAWINGS

FIG. 4 is a block diagram of a controller.

DETAILED DESCRIPTION

Figure 1:
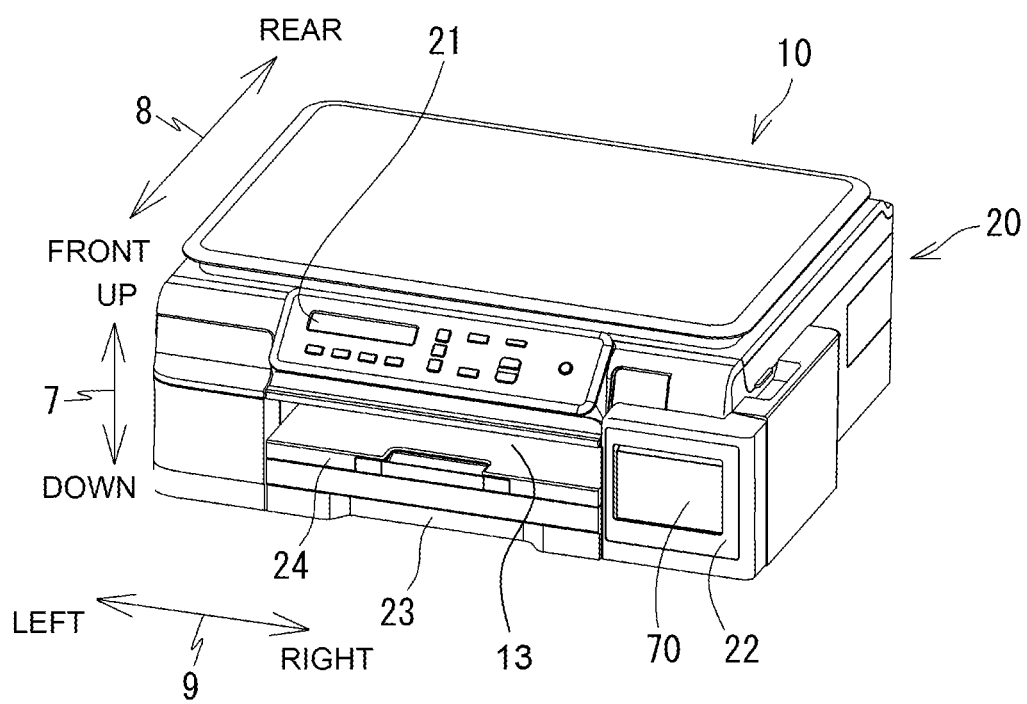
FIG. 1 is a perspective view of a printing apparatus.

In the following, a printing apparatus 10 (an example of an "ink discharging apparatus") according to an embodiment of the present disclosure will be explained. Note that the embodiment which is to be explained below is merely an example of the present disclosure; it is needless to say that the embodiment can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". Further, in the following explanation, an up-down direction 7 is defined, with a state in which the printing apparatus 10 is installed usably (a state of FIG. 1), as the reference; a front-rear direction 8 (an example of a "first direction") is defined, with a side on which a discharge port 13 is provided is defined as a front side (front surface); and a left-right direction 9 (an example of a "second direction") is defined, with the printing apparatus 10 as seen from the front side (front surface). The front-rear direction 8 and the left-right direction 9 are orthogonal to each other.

[Outer Configuration of Printing Apparatus 10]

As depicted in FIG. 1, the printer 10 is provided with a casing 20; and a panel unit 21, a cover 22, a paper feed tray 23 and a paper discharge tray 24 which are held by the casing 20. The printer 10 records an image on a sheet 6 (see FIG. 2).

The sheet 6 is an example of a "recording medium". The sheet 6 may be a recording medium which is cut to a predetermined size, or may be a recording medium which is a sheet pulled from a roll formed of the sheet wound in a cylindrical tube shape, or may be a recording medium of fan-fold type. Further, the sheet 6 may be plain paper, or coated paper (coated paper sheet). The term "coated paper" means high quality printing paper, medium quality printing paper, etc., which is plain paper having a pulp as a constituent element thereof and having a coating agent applied thereon for a purpose of improving the smoothness, whiteness, glossiness, etc.; specifically, the coated paper is exemplified by high quality coated paper, medium quality coated paper, etc. Although the printing apparatus 10 is suitably usable for ink-jet recording on the coated paper, the usage of the printing apparatus 10 is not limited to the recording on the coated paper; it is possible to use the printing apparatus 10 also for ink-jet recording with respect to a recording medium which is different from the coated paper and which includes, for example, plain paper, glossy paper, mat paper, synthetic paper, cardboard (paperboard), corrugated cardboard, film, etc. Further, the sheet 6 may be a tack paper in which an adhesive and release paper are combined.

The panel unit 21 is provided with a touch panel and a plurality of operation switches. The panel unit 21 receives an operation by a user.

Figure 2:
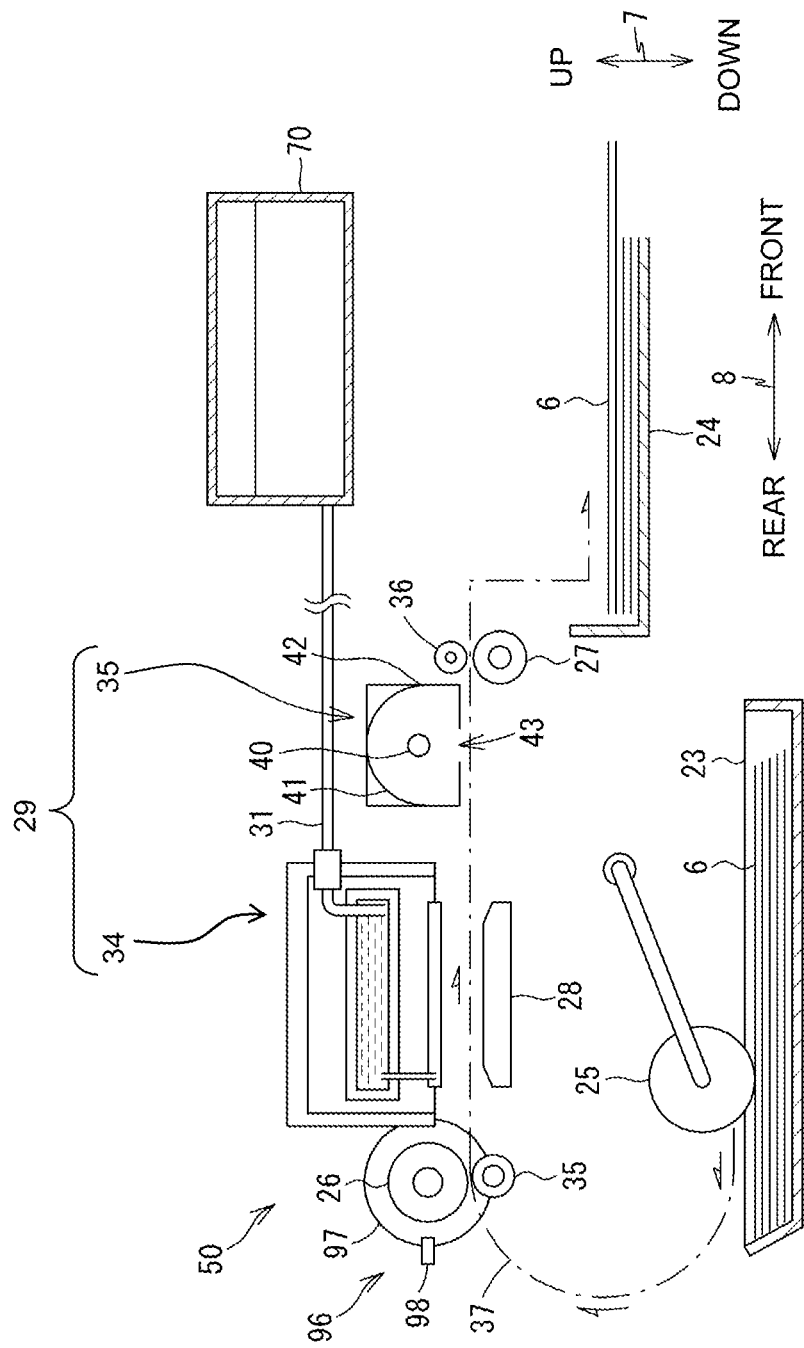
FIG. 2 is a schematic view depicting the internal configuration of the printing apparatus.

As depicted in FIG. 2, the paper feed tray 23 is positioned in a lower part of the casing 20. The paper discharge tray 24 is positioned in the lower part of the casing 20, at a location above the paper feed tray 23. The cover 22 is positioned in a right part of the front surface of the casing 20. The cover 22 is rotatable with respect to the casing 20. In a case that the cover 22 is opened, it is possible to access to a tank 70 storing an ink.

Note that although only one tank 70 is depicted in the present embodiment, the tank 70 is not limited or restricted by being a tank storing one color ink such as black, etc.; it is allowable, for example, that the tank 70 may be a tank having four storing chambers which store four color inks that are black, yellow, cyan and magenta, respectively.

As depicted in FIG. 2, the casing 20 holds a printing engine 50 in the inside of the casing 20. The printing engine 50 is mainly provided with a paper feeding roller 25, a conveying roller 26, a discharging roller 27, a platen 28 and a recording unit 29. The paper feeding roller 25 is held by a non-illustrated frame provided in the inside of the casing 20 so that the paper feeding roller 25 is capable of making contact with the sheet 6 placed in the paper feed tray 23. The paper feeding roller 25 is rotated by a non-illustrated motor. The paper feeding roller 25 which is (being) rotated feeds the sheet 6 to a conveying path 37. The conveying path 37 is a space defined by a non-illustrated guide member. In the example depicted in the drawing, the conveying path 37 is curved and extends from a rear end of the paper feed tray 23 up to a position above the paper feed tray 23, and then extends frontward. The paper feeding roller 25, the conveying roller 26 and the discharging roller 27 are an example of a "conveyor (conveying mechanism)".

In the present specification, a direction along the conveying path 37 in which the sheet 6 is conveyed is referred to as a "conveying direction". The sheet 6 is conveyed from the paper feed tray 23 to the paper discharge tray 24 along the conveying path 37. Namely, an orientation from the paper feed tray 23 toward the paper discharge tray 24 along the conveying path 37 is referred to as an "conveying orientation". In the conveying path 37, a side closer to the paper feed tray 23 is referred to as an "upstream in the conveying direction" or an "upstream in the conveying orientation". Further, in the conveying path 37, a side closer to the paper discharge tray 24 is referred to as a "downstream in the conveying direction" or a "downstream in the conveying orientation". The conveying roller 26 is located at the downstream, in the conveying orientation of the sheet 6, of the paper feed tray 23. The conveying roller 26 constructs a roller pair together with a driven roller 35. The conveying roller 26 is rotated by a non-illustrated motor. The conveying roller 26 and the driven roller 35 which are (being) rotated convey the sheet 6 fed to the conveying path 37 by the paper feeding roller 25, while pinching or holding the sheet 6 between the conveying roller 26 and driven roller 35. The discharging roller 27 is located at the downstream, in the conveying orientation of the sheet 6, of the conveying roller 26. The discharging roller 27 constructs a roller pair together with a driven roller 36. The discharging roller 27 is driven by a non-illustrated motor. The discharging roller 27 and the driven roller 36 which are (being) rotated convey the sheet 6 and discharge the sheet 6 to the paper discharge tray 24, while pinching or holding the sheet 6 between the discharging roller 27 and driven roller 36. The platen 28 is positioned between the conveying roller 26 and the discharging roller 27 in the front-rear direction 8, at the downstream, in the conveying orientation of the sheet 6, of the conveying roller 26 and at the upstream, in the conveying orientation of the sheet 6, of the discharging roller 27.

The conveying roller 26 is provided with a rotary encoder 96. The rotary encoder 96 is an example of a "speed sensor". The rotary encoder 96 has an encoder disc 97 and an optical sensor 98. The encoder disc 97 is provided coaxially with the conveying roller 26, and rotates together with the conveying roller 26. The encoder disc 97 has a plurality of indexes. They are two kinds of indexes of which transmittance are mutually different. In the encoder disc 97, the two kinds of indexes are arranged alternately in the entire circumference in the circumferential direction of the encoder disc 97. The optical sensor 98 is capable of optically reading the two kinds of indexes of the encoder disc 97. By the reading, by the optical sensor 98, of the two kinds of indexes of the encoder disc 97 which is rotating, two kinds of signals are outputted in a pulsed shape from the optical sensor 98. The output signals from the optical sensor 98 are received by a controller which is to be described later on so as to determine a rotating speed of the conveying roller 26.

The recording unit 29 has a printing head 34 and a heater 35. The printing head 34 is positioned, in the front-rear direction 8, between the conveying roller 26 and the discharging roller 27. The printing head 34 may be a so-called serial head, or may be a so-called line head. The printing head 34 has a channel in which the ink flows and which is formed in the inside of the printing head 34. This channel is communicated with the tank 70 by a tube 31. Namely, the ink(s) stored by the tank 70 is(are) supplied to the printing head 34 via the tube 31.

The platen 28 is positioned at a location below the printing head 34. An upper surface of the platen 28 is a supporting surface of the sheet 6. Although not depicted in the respective drawings, an opening in which a suction pressure is generated is formed in the upper surface of the platen 28. By the suction pressure generated in the upper surface of the platen 28, the sheet 6 makes a tight contact with the upper surface of the platen 28.

Figure 3:
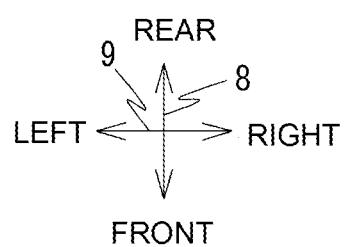
FIG. 3 is a schematic view of a heater, as seen from thereabove.
Figure 3:
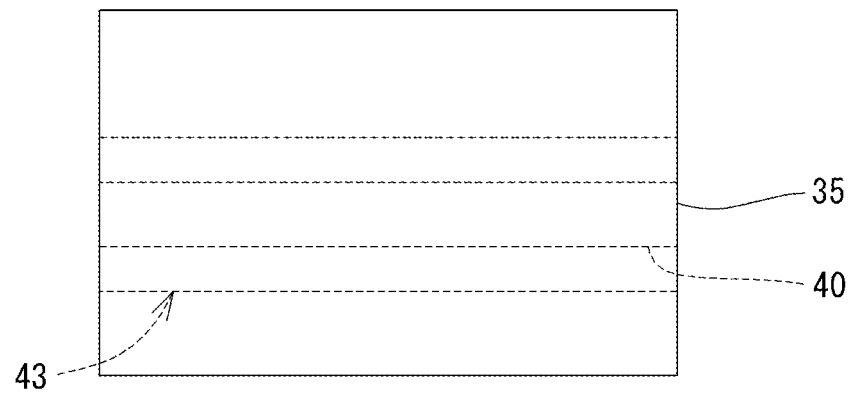
Figure 3:
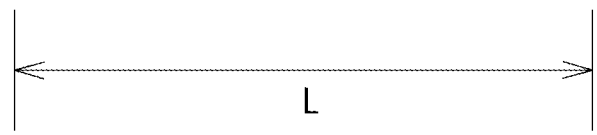

As depicted in FIGS. 2 and 3, the heater 35 is positioned at a location above the conveying path 37, at the downstream, in the conveying direction, of the printing head 34, and at the upstream, in the conveying direction, of the discharging roller 27. The heater 35 is a so-called halogen heater.

As depicted in FIG. 2, the heater 35 is positioned at the downstream in the conveying orientation of the printing head 24, namely, positioned in front of the printing head 24. The heater 35 has a halogen lamp 40 which is a heating element and which radiates an infrared light, a reflective plate 41 and a casing 42. The casing 42 has a shape of substantially rectangular parallelepiped, and is opened downward. An opening 43 is positioned in a lower wall of the casing 42. Via the opening 43, the heat from the halogen lamp 40 and/or the reflective plate 41 is/are radiated to the outside and is shielded.

The halogen lamp 40 is positioned in an internal space of the casing 42. The halogen lamp 40 has a shape of a slender cylindrical tube of which longitudinal direction is the left-right direction 9. In the internal space of the casing 42, the reflective plate 41 is positioned at a location above the halogen lamp 40. The reflective plate 41 is a metallic plate coated with a ceramic film, etc., and is curved in an arc shape with the vicinity of the opening 43 as the central axis. Note that it is allowable to use a halogen lamp 40 coated with a ceramic film, etc., instead of using the reflective plate 41.

The heater 35 heats at least one of the sheet 6 which is passing through the location below the opening 43 and the ink adhered to the sheet 6. In the present embodiment, the heater 35 heats both of the sheet 6 and the ink. By heating the ink, the resin fine particles undergo the glass transition, and by allowing the sheet 6 having passed the location below the heater 35 to be cooled, the resin which has undergone the glass transition is cured. With this, the ink is fixed to the sheet 6.

In view of the demand of miniaturization, the power consumption of the heater 35 is preferably not more than 600 W, more preferably not more than 400 W, particularly preferably not more than 200 W. The power consumption of the heater 35 relates to an energy which is radiated from the heater 35 per unit area of the sheet (radiation energy (b)). The radiation energy (b) is a heating amount (J) applied to the unit area ($cm^2$) of the sheet in a case that the heater 35 is driven in accordance with the power consumption and that the sheet moving at the location below the heater 35 is moved at a constant conveying speed.

As depicted in FIG. 3, in view of the demand for the miniaturization, an irradiation length L, of the heater 35, which is along the left-right direction 9 (an example of a "width direction", an example of the "second direction"), namely, the length L of a range in which the halogen lamp 40 and the opening 43 overlap with each other and along the left-right direction 9 is preferably not more than 25 cm, more preferably not more than 21 cm, particularly preferably not more than 15 cm.

Note that the heater 35 is not limited to the halogen heater, provided that the heater 35 is a heater which is capable of heating the sheet or the ink. For example, the heater 35 may be a carbon heater, a dryer, an oven, a belt conveyor oven, etc.

As depicted in FIG. 4, a controller 74 and an electric power circuit (not depicted in the drawings) are arranged in the internal space of the casing 20. The controller 74 is constructed by connecting a CPU 31, a ROM 132, a RAM 133, an EEPROM 134, an ASIC 135, etc., by a bus 137 to be capable of data communication. The CPU 131 executes a program stored in the ROM 132, and the ASIC 135 performs a specific function which is set, thereby controlling an operation of the printing apparatus 10.

Note that in the controller 74, it is allowable that only the CPU 131 performs respective kinds of processing, or that only the ASIC 135 performs the respective kinds of processings. Alternatively, it is allowable that a plurality of pieces of the CPU 131 are mounted on the controller 74 and that the plurality of pieces of the CPU 131 perform the respective processings in a sharing manner. Still alternatively, it is allowable that a plurality of pieces of the ASIC 135 are mounted on the controller 74 and that the plurality of pieces of the ASIC 135 perform the respective processings in a sharing manner.

The electric power circuit is a circuit constructed of a large capacity capacitor, etc. In the present embodiment, the electric power circuit is mounted on a substrate constructed of paper phenol, etc. The electric power circuit is a circuit performing the conversion of electric power for supplying the electricity to respective constituent components or parts provided on the printing apparatus 10.

For example, the electric power is supplied from the electric power circuit to a feeding motor 102 and a conveying motor 101, and the rotations of the respective motors 102 and 101 are transmitted to the paper feeding roller 25, the conveying roller 26 and the discharging roller 27. Further, the electric power is supplied from the electric power circuit to the heater 35.

The controller 74 controls the rotational speeds of the conveying roller 26 and the discharging roller 27 so that a cumulative heating amount received per unit area of the sheet 6 from the heater 35 at a position (facing position) at which the sheet 6 faces the heater 35 is within a range of not less than 0.7 J/cm$^2$ to not more than 2.9 J/cm$^2$, more preferably within a range of not less than 1.1 J/cm$^2$ to not more than 2.9 J/cm$^2$, particularly preferably within a range of not less than 1.4 J/cm$^2$ to not more than 2.9 J/cm$^2$. Namely, the controller 74 controls a conveying speed of the sheet 6 at the location below the heater 35 (the facing position facing the heater 35). Note that as depicted in FIG. 2, the sheet 6 is conveyed in the front-rear direction 8 at the facing position facing the heater 35. Namely, at the facing position, the conveying direction of the sheet 6 is the front-rear direction 8 (an example of the first direction).

The cumulative heating amount per the unit area of the sheet 6 can be measured, for example, by the following manner. An electric power density (W/m$^2$) which is an electric power per unit area of the heater 35 is calculated from the electric power applied to the heater 35, and an area in which the heater 35 radiates the infrared light (an area in a plane along the front-rear direction 8 and the left-right direction 9) (for example, a projected area of the opening 43). For example, in a case that the power consumption of the heater 35 is 600 W and that the area in which the heater 35 radiates the infrared light is 50 cm$^2$, the electric power density is 12 W/m$^2$. Further, a time (second) required for a fixed point in the sheet 6 to pass the area in which the heater 35 radiates the infrared light is calculated from the conveying speed of the sheet 6. Then, by multiplying the time with the electric power density, the cumulative heating amount (J/cm$^2$) is calculated.

[Composition of Ink]

In the following, the ink (an example of a "water-based ink for recording") stored in the tank 70 will be explained in detail. The ink includes a resin-dispersed pigment (resin-dispersible pigment, resin dispersion type pigment), resin fine particles, a water-soluble organic solvent and water.

The resin-dispersed pigment is dispersible in water by, for example, a resin for dispersing pigment (resin dispersant). The resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like. Specific examples of resin-dispersed pigments other than those described above are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 48:3, 53:1, 57, 57:1, 112, 122, 123, 139, 144, 146, 149, 150, 166, 168, 175, 176, 177, 178, 184, 185, 190, 202, 209, 221, 222, 224, 238 and 254; C. I. Pigment Violets 19 and 196; C. I. Pigment Blues 1, 2, 3, 15, 15:1, 15:2, 15:3, 15:4, 16, 22 and 60; C. I. Pigment Greens 7 and 36; and a solid solution of any one of the above-described pigments; etc. Note that the ink may further include another pigment and another dye, etc., in addition to the resin-dispersed pigment. Further, note that it is allowable that the ink includes only the resin-dispersed pigment as the colorant, and that the ink does not contain another colorant (a pigment, a dye, etc.)

A pigment solid content amount of the resin-dispersed pigment (pigment solid component amount (P)) in the entire amount of the water-based ink is not particularly limited, and can be determined appropriately, for example, in accordance with a desired optical density or chromaticness, etc. For example, the pigment solid component amount (P) is preferably within a range of not less than 0.1% by mass to not more than 20.0% by mass, more preferably within a range of not less than 1.0% by mass to not more than 15.0% by mass, particularly preferably within a range of not less than 2.0% by mass to not more than 5.0% by mass. The pigment solid component amount (P) is a mass only of the pigment, and does not include the mass of the resin dispersant. Only one kind of the resin-dispersed pigment may be used singly, or two or more kinds of the resin-dispersed pigment may be used in combination.

As the resin fine particles, it is allowable to use, for example, resin fine particles including at least one of methacrylic acid and acrylic acid as a monomer; it is allowable to use, as the resin fine particles, for example, a commercially available product. It is allowable that the resin fine particles further include styrene, vinyl chloride, etc., as the monomer. The resin fine particles may be, for example, those included in a resin emulsion. The resin emulsion is composed, for example, of the resin fine particles and a dispersion medium (for example, water, etc.), wherein the resin fine particles are dispersed with respect to the dispersion medium within a range of a specific particle diameter, not being in a dissolved state. The resin fine particles included in the resin emulsion are exemplified, for example, by: fine particles of a resin based on acrylic acid, a resin based on maleate ester, a resin based on vinyl acetate, a resin based on carbonate, a resin based on polycarbonate, a resin based on styrene, a resin based on ethylene, a resin based on polyethylene, a resin based on propylene, a resin based on polypropylene, a resin based on urethane, a resin based on polyurethane, a resin based on polyester, and a resin of copolymer of the above-described resins, etc.

The glass transition temperature (Tg) of the resin fine particles may be, for example, in a range of not less than 0° C. to not more than 120° C., in a range of not less than 15° C. to not more than 120° C., or in a range of not less than 30° C. to not more than 80° C. By using resin fine particles of which Tg is within the above-described range, it is possible to obtain a water-based ink which has an excellent abrasion resistance in the recording medium.

The glass transition temperature (Tg) of the resin fine particles can be measured, for example, as follows. A differential scanning calorimeter "EXSTAR (trade name) 6000" (manufactured by SEIKO INSTRUMENTS INC.) is used; a container which is made of aluminum and in which 5 mg of a sample is stored is set in the apparatus (the differential scanning calorimeter); and the temperature is increased from 20° C. up to 200° C. under an atmosphere of nitrogen and under a condition of a temperature increasing rate of 10° C./minute. Then, after maintaining the sample for 1 (one) minute at 200° C., the sample is cooled up to −20° C. at a cooling rate of −10° C./minute. Then, after further maintaining the sample for 1 (one) minute at −20° C., the temperature of is raised up to 200° C. at the temperature increasing rate of 10° C./minute. By doing so, a DSC (Differential Scanning Calorimetry) curve is obtained. Based on the obtained DSC curve, the point of inflection in the second temperature increasing process is defined as the glass transition temperature.

As the resin emulsion, for example, a commercially available product of resin emulsion may be used. The commercially available product of the resin emulsion is exemplified, for example, by "870" (Tg: 71° C.) and "150" (Tg: 40° C.), manufactured by DKS CO., LTD (DAI-ICHI KOGYO SEIYAKU CO., LTD.); "6969D" (Tg: 77° C.) and "DM774" (Tg: 33° C.) manufactured by JAPAN COATING RESIN CO., LTD.; "AP-3270N" (Tg: 27° C.) manufactured by SHOWA DENKO K.K.; KE-1062" (Tg: 112° C.) and QE-1042" (Tg: 69° C.) manufactured by SEIKO PMC CORPORATION); and the like.

The average particle diameter (average particle size) of the resin fine particles is, for example, within a range of not less than 30 nm to not more than 200 nm. The average particle diameter can be measured, for example, by using a dynamic light scattering particle diameter distribution measuring apparatus "LB-550" manufactured by HORIBA, LTD., as an arithmetic average diameter.

The content amount (R) of the resin fine particles in the entire amount of the water-based ink is, for example, preferably within a range of not less than 0.1% by mass to not more than 30% by mass, more preferably within a range of not less than 0.5% by mass to not more than 20% by mass, particularly preferably within a range of not less than 4.0% by mass to not more than 10.0% by mass. One kind of the resin fine particles may be used singly, or two or more kinds of the resin fine particles may be used in combination. Further, a ratio P:R of the pigment solid component amount (P) of the resin-dispersed pigment to the content amount (R) of the resin fine particles in the entire amount of the water-based ink is, for example, within a range of P:R=1:4 to 4:1, within a range of P/R=1:2 to 2:1 or within a range of P/R=1:1 to 1:2.

The water-soluble organic solvent is such an organic solvent that, when mixing the organic solvent and water at a ratio of 1:1, the organic solvent and the water are mixed uniformly. It is presumed that for example in the internal space of the casing 20 of the printing apparatus 10, the water-soluble organic solvent makes the paper feeding roller 25, the platen 28, the conveying roller 26 and the discharging roller 27 each of which is a rubber member or a resin member to swell to thereby cause any degradation of the strength, while raising the re-dispersibility of a dried ink. In particular, in a case that the temperature in the internal space of the casing 20 is raised by the heat of the heater 35, the strength of the rubber member and/or the resin member is easily lowered.

Accordingly, the water-soluble organic solvent includes a water-soluble organic solvent, of which saturated vapor pressure at 20° C. is within a range of not less than 0.03 hPa and not more than 2.20 hPa (hereinafter referred to as a "specific water-soluble organic solvent), within a range of a predetermined content amount, and the water-soluble organic solvent does not include, in a predetermined content amount or more, a water-soluble organic solvent of which saturated vapor pressure at 20° C. is greater than 2.20 hPa (hereinafter referred to as an "excludable water-soluble organic solvent 1"); and the water-soluble organic solvent does not include, in a predetermined content amount or more, a water-soluble organic solvent, of which saturated vapor pressure at 20° C. is smaller than 0.03 hPa (hereinafter referred to as an "excludable water-soluble organic solvent 2"). Note that the specific water-soluble organic solvent is an example of a "first water-soluble organic solvent", the excludable water-soluble organic solvent 1 is an example of a "second water-soluble organic solvent", and the excludable water-soluble organic solvent 2 is an example of a "third water-soluble organic solvent".

The specific water-soluble organic solvent is exemplified, for example, by propylene glycol (vapor pressure at 20° C.: 0.11 hPa), ethylene glycol (vapor pressure at 20° C.: 0.07 hPa), 1,2-butanediol (vapor pressure at 20° C.: 0.03 hPa), propylene glycol propyl ether (vapor pressure at 20° C.: 2.20 hPa), dipropylene glycol propyl ether (vapor pressure at 20° C.: 0.1 hPa), diethylene glycol monobutyl ether (vapor pressure at 20° C.: 0.1 hPa), 1,6-hexanediol (vapor pressure at 20° C.: 0.7 hPa), etc., and propylene glycol or 1,2-butanediol is preferred. The saturated vapor pressure at 20° C. of the specific water-soluble organic solvent is preferably in a range of 0.03 hPa to 0.11 hPa. In a case that the specific water-soluble organic solvent is propylene glycol or 1,2-butanediol of which saturated vapor pressure at 20° C. is in the range of 0.03 hPa to 0.11 hPa, it is possible to obtain an ink which is excellent in the abrasion resistance of the recording medium, and which is excellent in the durability of apparatus with respect to a rubber member and/or a resin member positioned in the inside of the printing apparatus 10.

The content amount of the specific water-soluble organic solvent in the entire amount of the ink is preferably in a range of not less than 10% by mass to not more than 40% by mass, more preferably in a range of not less than 20% by mass to not more than 40% by mass.

The excludable water-soluble organic solvent 1 is exemplified, for example, by isopropyl alcohol (vapor pressure at 20° C.: 60.0 hPa), etc. The excludable water-soluble organic solvent 2 is exemplified, for example, by 86% glycerol (vapor pressure at 20° C.: not more than 0.001 hPa), etc.

The content amount of the excludable water-soluble organic solvent 1 in the entire amount of the ink is, for example, less than 3% by mass, and preferably is 0 (zero). The content amount of the excludable water-soluble organic solvent 2 in the entire amount of the ink is, for example, less than 10% by mass, and preferably is 0 (zero).

The water is preferably ion-exchange water or purified water (pure water). A content amount (W) of the water with respect to the entire amount of the ink is, for example, preferably within a range of not less than 10% by mass to not more than 90% by mass, more preferably within a range of not less than 20% by mass to not more than 80% by mass. The content amount (W) of the water may be, for example, a balance of the other components.

The ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The ink can be prepared, for example, by uniformly mixing the resin-dispersed pigment, the resin fine particles, the specific water-soluble organic solvent and the water, and an optionally other additive(s) as necessary, by a conventionally known method, and then removing any non-dissolved matter, with a filter, etc.

[Operation of Printing Apparatus 10]

In the following, an operation of image recording by the printing apparatus 10 will be explained, with reference to FIG. 4.

In a case that the controller 74 receives print data, the controller 74 causes the paper feeding roller 25, the conveying roller 26 and the discharging roller 27 to rotate (rotate normally) so as to feed the sheet 6 to the location below the printing head 24.

The controller 74 controls the conveying roller 26 and the discharging roller 27 so as to convey the sheet 6 along the conveying direction from the upstream toward the downstream in the conveying direction. At the position facing the heater 35, the sheet 6 is conveyed frontward in the front-rear direction 8. Namely, at the position facing the heater 35, the conveying direction is the front-rear direction 8 (an example of the first direction). At the position facing the heater 35, the conveying speed of the sheet 6 is preferably within a range of not less than 15 cm/second to not more than 100 cm/second, more preferably within a range of not less than 20 cm/second to not more than 70 cm/second, particularly more preferably within a range of not less than 20 cm/second to not more than 40 cm/second. The controller 74 controls the conveying speed of the sheet 6 so that the conveying speed of the sheet 6 is within the above-described range. Specifically, the controller 74 controls the conveying roller 26 and the discharging roller 27 so as to rotate the conveying roller 26 and the discharging roller 27 so that the conveying speed of the sheet 6 is within the above-described range. Such a control of the conveying speed is realized, for example, by performing control of the rotation of the conveying roller 26 based on the signals of the rotary encoder 96 provided on the conveying roller 26.

Further, the controller 74 turns on the power of the halogen lamp 40 of the heater 35. The cumulative heating amount applied per unit area of the sheet 6 from the heater 35 is, for example, preferably within a range of not less than 0.7 $J/cm^2$ to not more than 2.9 $J/cm^2$, more preferably within a range of not less than 1.1 $J/cm^2$ to not more than 2.9 $J/cm^2$, particularly preferably within a range of not less than 1.4 $J/cm^2$ to not more than 2.9 $J/cm^2$. Such a control of the irradiation energy per the unit area applied by the heater 35 is realized by controlling, by the controller 74, an electric power (W) supplied to the heater 35 and the rotation speed of each of the conveying roller 26 and the discharging roller 27. Further, the controller 74 causes the ink(s) to be discharged, based on the print data, from the printing head 34 toward the sheet 6, while causing the paper feeding roller 25, the conveying roller 26 and the discharging roller 27 to rotate (rotate normally).

The sheet 6 which is conveyed on the platen 28 toward the paper discharge tray 24 is moved toward the paper discharge tray 24, between the conveying roller 26 and the discharging roller 27, while being sucked by the upper surface of the platen 28. Ink droplets of the ink(s) discharged from the printing head 34 adhere to the sheet 6 which is supported by the upper surface of the platen 28. In a case that the sheet 6 to which the ink droplets are adhered reaches the location below the heater 35, the sheet 6 is heated by the heater 35. The ink droplets are fixed to the sheet 6 by the heating performed by the heater 35.

In a case that the controller 74 determines that the printing based on the print data is ended, then in accordance with this determination, the controller 74 conveys the sheet 6 until the sheet 6 is discharged to the paper discharge tray 24, then the controller 74 stops the paper feeding roller 25, the conveying roller 26 and the discharging roller 27. Further, the controller 74 turns off the power of the halogen lamp 40 of the heater 35.

By allowing the water-soluble organic solvent included in the ink to include the specific water-soluble organic solvent in the amount within the range of not less than 10% by mass to not more than 40% by mass, not to include the excludable water-soluble organic solvent 1 in the amount at 3% by mass or more and not to include the excludable water-soluble organic solvent 2 at 10% by mass and more, with respect to the entire amount of the water-based ink for recording, it is possible to increase the re-dispersibility of the dried ink and to suppress any lowering in the strength of the rubber member and/or the resin member provided in the internal space of the casing 20 of the printing apparatus 10. Namely, the ink used in the present embodiment hardly effects the durability of the printing apparatus 10.

Further, by making the cumulative heating amount received per unit area of the sheet 6 from the heater 35 to be within the range of not less than 0.7 $J/cm^2$ to not more than 2.9 $J/cm^2$, then even in a case that electric power density ($W/cm^2$) applied per unit area of the sheet 6 by a small-sized heater 35 is not great, the resin fine particles are melted so as to form a film which has an appropriate thickness and which covers the resin-dispersed pigment included in the ink. It is presumed that the abrasion resistance (friction resistance) of the ink is improved by making the strength of this film to be high. By using the small-sized heater 35, any increase in the size of the printing apparatus 10 is suppressed.

As described above, in the printing apparatus 10 of the present embodiment, the abrasion resistance of the recording medium after printing is excellent, the re-dispersibility of the ink is excellent, and the durability of the apparatus is less likely to be affected, while suppressing any increase in the size of the apparatus.

EXAMPLES

In the following, Examples of the present disclosure are explained together with Comparative Examples. Note that the present disclosure is not limited to or restricted by Examples and Comparative Examples described below.

[Aqueous Pigment Dispersion A]

Pure water (purified water) was added to 20% by mass of a pigment (carbon black) and 7% by mass of a sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter (pore size 3.0 μm). Thus, aqueous pigment dispersion (water pigment dispersion) A was obtained. Note that the styrene-acrylic acid copolymer is a water-soluble polymer which is generally used as a dispersant for pigment (pigment dispersant).

[Aqueous Pigment Dispersion B]

Aqueous pigment dispersion B was prepared in a similar procedure as regarding the aqueous pigment dispersion A, except that the pigment was changed to Pigment Blue 15:3.

[Preparation of Water-Based Ink for Recording]

Components, which were included in Water-based Ink Composition as indicated in TABLE 1 and TABLE 2 and which were different from the fine resin particles and the aqueous pigment dispersion (resin-dispersed aqueous pigment dispersion), were mixed uniformly or homogeneously; and thus an ink solvent was obtained. Subsequently, the resin fine particles were added to the ink solvent followed by being mixed uniformly, and then the aqueous pigment dispersion was added to the obtained mixture so as to obtain a mixture of which entire amount was 100% by mass. After that, the obtained mixture was filtrated through a cellulose acetate membrane filter (pore size 3.00 μm) produced by TOYO ROSHI KAISHA, LTD., and thus a water-based ink for recording of each of Examples 1 to 16 and Comparative Examples 1 to 6 indicated in TABLE 1 and TABLE 2 was obtained.

Resin fine particles: "870" (Tg: 71° C.), manufactured by DKS CO., LTD (DAI-ICHI KOGYO SEIYAKU CO., LTD.); "6969D" (Tg: 77° C.), "DM774" (Tg: 33° C.) manufactured by JAPAN COATING RESIN CO., LTD.; "AP-3270N" (Tg: 27° C.) manufactured by SHOWA DENKO K.K.

Water-soluble organic solvent: propylene glycol (vapor pressure at 20° C.: 0.11 hPa), 1,2-butanediol (vapor pressure at 20° C.: 0.03 hPa), propylene glycol propyl ether (vapor pressure at 20° C.: 2.20 hPa), 86% glycerol (vapor pressure at 20° C.: not more than 0.001 hPa), isopropyl alcohol (vapor pressure at 20° C.: 60.0 hPa)

Surfactant: "E1010" manufactured by NISSHIN KAGAKU KOGYO KK

The water-based inks of Examples 1 to 16 and Comparative Examples 1 to 6 were used so as to evaluate the abrasion resistance, the re-dispersibility, and the durability of apparatus by the following methods.

[Abrasion Resistance]

The water-based ink for recording of each of Examples 1 to 16 and Comparative Examples 1 to 6 was used to perform draw down on coated paper ("OK TOP COAT+(a registered trade mark of OJI PAPER CO., LTD.)" produced by OJI PAPER CO., LTD.) so that a thickness of the film became to be 3 mm, and thus an evaluation sample was obtained. The evaluation sample was made to pass a location immediately below a IR heater "SIR-760" manufactured by TOHKOH TRADE CO., LTD., (heating length: 6.2 cm, power output: 600 W) in a conveying speed by which the cumulative heating amount per unit area of the coated paper was within a range of not less than 0.7 J/cm$^2$ to not more than 2.9 J/cm$^2$, thereby performing drying (heating) of the evaluation sample. Afterwards, a load of 500 g was applied to a cotton swab made by JOHNSON & JOHNSON K.K., and the cotton swab was made to rub (scratch) one time each for three locations in the evaluation sample, thereby performing a rubbing (scratching) test of the evaluation sample. Regarding the evaluation sample for which the rubbing was performed, a blank paper part (blank sheet part) which is adjacent to an ink coated part coated with the ink was evaluated, by a visual inspection, based on the following criterion for evaluation. Note that an evaluation sample, in which any scorching occurred, was determined to be unevaluable (NG).

An evaluation sample in which any rubbing and dirtied part (smudge) were not present was evaluated as "G (Good)";

An evaluation sample in which a rubbing was present but any dirtied part was not present was evaluated as "F (Fair)"; and An evaluation sample in which both a rubbing and a dirtied part were present was evaluated as "P (Poor)".

Note that the "rubbing" is a trace of rubbing which is visually recognizable in the ink coated part, and that the "dirtied part" is a trace of rubbing visually recognizable in the blank sheet part (a trace of the ink adhered to the cotton swab which was transferred to the black sheet part). The evaluation samples were classified into the following groups, based on the results of evaluation in the three locations, and an evaluation sample receiving the result of "B" or higher was determined to be "passing" the evaluation.

<Criterion for Evaluation of Abrasion Resistance>

AA: "G" in all the three locations;

A: "G" in two locations and no "P" among the three locations;

B: "G" in one location, and no "P" among the three locations; and

C: "P" in any one of the three locations.

[Re-Dispersibility]

The water-based ink for recording of each of Examples 1 to 16 and Comparative Examples 1 to 6 was dripped as a liquid droplet of a constant amount on a slide glass, and was allowed to stand still for 1 (one) hour at 25° C., thereby obtaining an evaluation sample. A water droplet was dripped to the water-based ink for recording of the evaluation sample, an observation was made as to the way by which the water-based ink for recording was re-dispersed, and evaluation was made in accordance with the following criterion for evaluation.

<Criterion for Evaluation of Re-Dispersibility>

VG: There was no mass (lump) of a size visible to the naked eyes.

G: Although there was a mass of a size visible to the naked eyes, an area of a solidified part was less than half the entire area of the ink.

P: There was a mass of a size visible to the naked eyes, and an area of a solidified part was greater than half the entire area of the ink.

[Durability of Apparatus]

The presumption was made that in a case that the saturated vapor pressure at 20° C. was not more than 2.2 hPa, the vapor concentration of the water-soluble organic solvent becomes to be not more than 3% at 50° C. in the internal space of the casing of the printing apparatus; and an evaluation sample having a water-soluble organic solvent of which saturated vapor pressure at 20° C. was not more than 2.2 hPa was determined to be "G (Good)", and an evaluation sample having a water-soluble organic solvent of which saturated vapor pressure at 20° C. was greater than 2.2 hPa was determined to be "P (Poor)".

Note that the above-described presumption was considered on the basis of the saturated vapor pressure curve of the respective substances calculated from the constant of the Antoine equation which is described on page 18 and thereafter of "KAGAKU KOUGAKU BINRAN (Chemical Engineering Reference; Revised 5th edition). The temperature of 50° C. is the maximum temperature to which the apparatus configuration described in the present application is estimated to reach; and the vapor concentration of 3% is derived from that a swelling concentration by which any remarkable lowering in the strength is not observed in a rubber/resin member(s) is 3%.

The water-based ink composition and the results of evaluations of each of the water-based inks of Examples 1 to 16 and Comparative Examples 1 to 6 are indicated in TABLE 1 and TABLE 2.

Tables 1 and 2 (Following)—Legend

*1: The numeral of the resin-dispersed pigment indicates a solid pigment component amount of the pigment.

*2: The numeral of the resin fine particles indicates a solid component amount of the resin fine particles.

TABLE 1

| | | | | EXAMPLES | | | | | | | |
|---|---|---|---|---|---|---|---|---|---|---|---|
| | | | | 1 | 2 | 3 | 4 | 5 | 6 | 7 | 8 |
| Composition of Water-based Ink for recording (% by mass) | Resin-dispersed pigment *1 | Carbon Black | | 4.0 | 4.0 | 4.0 | 4.0 | 4.0 | 4.0 | 4.0 | 4.0 |
| | | Pigment Blue 15:3 | | — | — | — | — | — | — | — | — |
| | | | Tg (° C.) | | | | | | | | |
| | Resin fine particles *2 | SUPERFLEX 870 | 71 | 4.0 | 4.0 | 4.0 | 4.0 | 4.0 | 4.0 | — | — |
| | | MOWIN YL 6969D | 77 | — | — | — | — | — | — | 4.0 | 4.0 |
| | | POLYSOL AP-3270N | 27 | — | — | — | — | — | — | — | — |
| | | MOWINYL DM774 | 33 | — | — | — | — | — | — | — | — |
| | | | Vapor Pressure (hPa) | | | | | | | | |
| | Organic solvent | Propylene glycol | 0.11 | 20.0 | 20.0 | 20.0 | 20.0 | — | — | 10.0 | 40.0 |
| | | 1,2-Butanediol | 0.03 | — | — | — | — | 20.0 | — | — | — |
| | | Propylene glycol propyl ether | 2.20 | — | — | — | — | — | 20.0 | — | — |
| | | 86% Glycerol | <0.001 | — | — | — | — | — | — | — | — |
| | | Isopropyl alcohol | 60.0 | — | — | — | — | — | — | — | — |
| | Surfactant | OLFIN EI010 | | 1.0 | 1.0 | 1.0 | 1.0 | 1.0 | 1.0 | 1.0 | 1.0 |
| | | Water | | balance | balance | balance | balance | balance | balance | balance | balance |
| Drying condition | | Cumulative heating amount (J/cm²) | | 2.9 | 1.4 | 1.1 | 0.7 | 1.4 | 1.4 | 1.4 | 1.4 |
| Results of evaluations | | Durability of apparatus | | G | G | G | G | G | G | G | G |
| | | Re-dispersibility | | VG | VG | VG | VG | VG | G | VG | VG |
| | | Abrasion resistance | | AA | AA | AA | A | AA | AA | AA | AA |

| | | | | EXAMPLES | | | | | | | |
|---|---|---|---|---|---|---|---|---|---|---|---|
| | | | | 9 | 10 | 11 | 12 | 13 | 14 | 15 | 16 |
| Composition of Water-based Ink for recording (% by mass) | Resin-dispersed pigment *1 | Carbon Black | | — | 4.0 | 5.0 | 2.0 | 4.0 | — | 4.0 | 4.0 |
| | | Pigment Blue 15:3 | | 4.0 | — | — | — | — | 4.0 | — | — |
| | | | Tg (° C.) | | | | | | | | |
| | Resin fine particles *2 | SUPERFLEX 870 | 71 | 4.0 | — | 10.0 | 1.0 | 4.0 | 4.0 | — | — |
| | | MOWTNYL 6%9D | 77 | — | — | — | — | — | — | — | — |
| | | POLYSOL AP 3270N | 27 | — | 4.0 | — | — | — | — | 4.0 | — |
| | | MOWINYL DM774 | 33 | — | — | — | — | — | — | — | 4.0 |
| | | | Vapor Pressure (hPa) | | | | | | | | |
| | Organic solvent | Propylene glycol | 0.11 | 20.0 | 20.0 | 20.0 | 20.0 | — | 20.0 | 20.0 | 20.0 |
| | | 1,2-Butanediol | 0.03 | — | — | — | — | 20.0 | — | — | — |
| | | Propylene glycol propyl ether | 2.20 | — | — | — | — | — | — | — | — |
| | | 86% Glycerol | <0.001 | — | — | — | — | — | — | — | — |
| | | Isopropyl alcohol | 60.0 | — | — | — | — | — | — | — | — |
| | Surfactant | OLFIN E1010 | | 1.0 | 1.0 | 1.0 | 1.0 | 1.0 | 1.0 | 1.0 | 1.0 |
| | | Water | | balance | balance | balance | balance | balance | balance | balance | balance |
| Drying condition | | Cumulative heating amount (J/cm²) | | 1.4 | 1.4 | 1.4 | 1.4 | 0.7 | 0.7 | 0.7 | 0.7 |
| Results of evaluations | | Durability of apparatus | | G | G | G | G | G | G | G | G |
| | | Re-dispersibility | | VG | VG | G | VG | VG | VG | VG | VG |
| | | Abrasion resistance | | AA | AA | AA | A | B | B | B | A |

TABLE 2

|  |  |  |  | COMPARATIVE EXAMPLES | | | | | |
|---|---|---|---|---|---|---|---|---|---|
|  |  |  |  | 1 | 2 | 3 | 4 | 5 | 6 |
| Composition of Water-based Ink for recording (% by mass) | Resin-dispersed pigment *1 | Carbon Black | | 4.0 | 4.0 | 4.0 | 4.0 | 4.0 | 4.0 |
| | | Pigment Blue 15:3 | | — | — | — | — | — | — |
| | | | Tg (° C.) | | | | | | |
| | Resin fine particles *2 | SUPERFLEX 870 | 71 | 4.0 | 4.0 | — | — | 4.0 | 4.0 |
| | | MOWINYL 6969D | 77 | — | — | 4.0 | 4.0 | — | — |
| | | POLYSOL AP-3270N | 27 | — | — | — | — | — | — |
| | | MOWINYL DM774 | 33 | — | — | — | — | — | — |
| | | | Vapor Pressure (hPa) | | | | | | |
| | Organic solvent | Propylene glycol | 0.11 | 20.0 | 20.0 | 5.0 | 50.0 | — | — |
| | | 1,2-Butanediol | 0.03 | — | — | — | — | — | — |
| | | Propylene glycol propyl ether | 2.20 | — | — | — | — | — | — |
| | | 86% Glycerol | <0.001 | — | — | — | — | 10.0 | — |
| | | Isopropyl alcohol | 60.0 | — | — | — | — | — | 3.0 |
| | Surfactant | OLFIN E1010 | | 1.0 | 1.0 | 1.0 | 1.0 | 1.0 | 1.0 |
| | | Water | | balance | balance | balance | balance | balance | balance |
| Drying condition | | Cumulative heating amount (J/cm$^2$) | | 4.3 | 0.6 | 1.4 | 1.4 | 1.4 | 1.4 |
| Results of evaluations | | Durability of apparatus | | G | G | G | G | G | P |
| | | Re-dispersibility | | VG | VG | G | VG | P | P |
| | | Abrasion resistance | | NG | C | C | C | C | AA |

As indicated in TABLE 1, in Examples 1 to 16, the evaluations of the abrasion resistance, the re-dispersibility, the durability of apparatus did not have any evaluations of "C" or "P", and the results of the evaluations were satisfactory. Further, Examples 1 to 3 and 5 to 11, in each of which the cumulative heat amount per unit area of the coated paper was within the range of not less than 1.1 J/cm$^2$ to not more than 2.9 J/cm$^2$, the evaluation of the abrasion resistance was "AA" which was superior to those of other examples.

Further, Examples 2, 5 and 6 of which conditions were similar to one another except for the difference in the kind of the water-soluble organic solvent will be compared to one another. In Examples 2 and 5 each using the propylene glycol or 1,2-butanediol, as the water-soluble organic solvent, of which vapor pressure at 20° C. was within the range of not less than 0.03 hPa and not more than 0.11 hPa was more excellent in the re-dispersibility as compared with Example 6 which used the propylene glycol propyl ether of which vapor pressure at 20° C. was 2.20 hPa.

On the other hand, in Comparative Example 1 in which the cumulative heat amount per unit area of the coated paper was 4.3 J/cm$^2$, a scorching occurred in the coated paper. Further, in Comparative Example 2 in which the cumulative heat amount per unit area of the coated paper was 0.6 J/cm$^2$, the evaluation of the abrasion resistance was "C".

Furthermore, in both of Comparative Example 3 containing 5% by mass of propylene glycol and Comparative Example 4 containing 50% by mass of propylene glycol, the evaluation of the abrasion resistance was "C". Moreover, in Comparative Example 5 containing, as the water-soluble organic solvent, 10% by mass of 86% glycerol of which vapor pressure at 20° C. was not more than 0.001 hPa, the evaluation of the re-dispersibility was "P", and the evaluation of the abrasion resistance was "C". Further, in Comparative Example 6 containing, as the water-soluble organic solvent, 3% by mass of isopropyl alcohol of which vapor pressure at 20° C. was 60 hPa, the evaluation of the durability of apparatus was "P", and the evaluation of the re-dispersibility was "P".

What is claimed is:

1. An ink discharging apparatus comprising:
 a conveyor configured to convey a recording medium in a conveying direction;
 a head configured to discharge a water-based ink for recording onto the recording medium conveyed by the conveyor;
 a heater which is located at downstream in the conveying direction of the head, and which is configured to heat the recording medium or the water-based ink for recording adhered to the recording medium; and
 a controller configured to control the conveyor, the head and the heater,
 wherein the controller is configured to control the conveyor and the heater so as to control a conveying speed of the recording medium at a facing position at which the recording medium faces the heater so that a cumulative heating amount received per unit area of the recording medium from the heater at the facing position is in a range of 0.7 J/cm$^2$ to 2.9 J/cm$^2$; and
 the water-based ink for recording includes:
 a resin-dispersed pigment,
 resin fine particles,
 water, and
 a first water-soluble organic solvent of which saturated vapor pressure at 20° C. is in a range of 0.03 hPa to 2.20 hPa, the first water-soluble organic solvent being included in a range of 10% by mass to 40% by mass to an entire amount of the water-based ink for recording,
 wherein a content amount of a second water-soluble organic solvent, of which saturated vapor pressure at 20° C. is greater than 2.20 hPa, is less than 3% by mass to the entire amount of the water-based ink for recording; and
 a content amount of a third water-soluble organic solvent, of which saturated vapor pressure at 20° C. is less than 0.03 hPa, is less than 10% by mass to the entire amount of the water-based ink for recording.

2. The ink discharging apparatus according to claim 1, wherein the water-based ink for recording does not include the second water-soluble organic solvent and the third water-soluble organic solvent.

3. The ink discharging apparatus according to claim 1, wherein the controller is configured to control the conveyor and the heater so as to control the conveying speed of the recording medium at the facing position so that the cumulative heating amount is in a range of 1.1 J/cm² to 2.9 J/cm².

4. The ink discharging apparatus according to claim 1, wherein the controller is configured to control the conveyor so as to convey the recording medium at the conveying speed of the recording medium at the facing position in a range of 15 cm/second to 100 cm/second.

5. The ink discharging apparatus according to claim 1, wherein a glass transition temperature of the resin fine particles is in a range of 30° C. to 80° C.

6. The ink discharging apparatus according to claim 1, wherein the water-based ink for recording includes the resin fine particles in a range of 4.0% by mass to 10.0% by mass to the entire amount of the water-based ink for recording.

7. The ink discharging apparatus according to claim 1, wherein the water-based ink for recording includes the resin-dispersed pigment in a range of 2.0% by mass to 5.0% by to the entire amount of the water-based ink for recording.

8. The ink discharging apparatus according to claim 1, wherein an electrical power consumption of the heater is not more than 600 W.

9. The ink discharging apparatus according to claim 1, wherein at the facing position, the conveying direction of the recording medium is a first direction; and
an irradiation length, of the heater, along a second direction which is orthogonal to the first direction is not more than 21 cm.

10. The ink discharging apparatus according to claim 1, further comprising a casing which accommodates the conveyor, the head, the heater and the controller.

11. The ink discharging apparatus according to claim 1, wherein the saturated vapor pressure at 20° C. of the first water-soluble organic solvent is in a range of 0.03 hPa to 0.11 hPa.

12. The ink discharging apparatus according to claim 1, wherein the first water-soluble organic solvent is propylene glycol or 1,2-butanediol.

13. The ink discharging apparatus according to claim 1, wherein the resin fine particles are included in a resin emulsion.

14. An ink heating method of using the ink discharging apparatus as defined in claim 1, the ink heating method comprising conveying the recording medium to which the water-based ink for recording is adhered so that the cumulative heating amount received per unit area of the recording medium from the heater at the facing position is in a range of 0.7 J/cm² to 2.9 J/cm².

15. The ink heating method according to claim 14, wherein the recording medium or the water-based ink for recording which is adhered to the recording medium is heated by the heater so as to fix the water-based ink for recording to the recording medium.

16. A water-based ink for recording, comprising:
a resin-dispersed pigment,
resin fine particles,
water, and
a first water-soluble organic solvent of which saturated vapor pressure at 20° C. is in a range of 0.03 hPa to 2.20 hPa, the first water-soluble organic solvent being included in a range of 10% by mass to 40% by mass to an entire amount of the water-based ink for recording,
wherein a content amount of a second water-soluble organic solvent, of which saturated vapor pressure at 20° C. is greater than 2.20 hPa, is less than 3% by mass to the entire amount of the water-based ink for recording;
a content amount of a third water-soluble organic solvent, of which saturated vapor pressure at 20° C. is less than 0.03 hPa, is less than 10% by mass to the entire amount of the water-based ink for recording; and
wherein the water-based ink for recording discharged from a printing head is fixed to a recording medium in a state that the recording medium is heated by a heater so that a cumulative heating amount received per unit area of the recording medium from the heater is in a range of 0.7 J/cm² to 2.9 J/cm².

* * * * *